United States Patent
Ihara et al.

(10) Patent No.: US 11,732,317 B2
(45) Date of Patent: Aug. 22, 2023

(54) METHOD FOR PROCESSING STEEL PLATE

(71) Applicant: TOYOTA JIDOSHA KABUSHIKI KAISHA, Toyota (JP)

(72) Inventors: Tomoaki Ihara, Toyota (JP); Shunsuke Tobita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 16/750,373

(22) Filed: Jan. 23, 2020

(65) Prior Publication Data
US 2020/0239974 A1 Jul. 30, 2020

(30) Foreign Application Priority Data

Jan. 25, 2019 (JP) .................................. 2019-011010
Dec. 13, 2019 (JP) .................................. 2019-225206

(51) Int. Cl.
*C21D 1/42* (2006.01)
*B21D 28/26* (2006.01)

(52) U.S. Cl.
CPC .............. *C21D 1/42* (2013.01); *B21D 28/26* (2013.01); *C21D 2221/02* (2013.01); *C21D 2261/00* (2013.01)

(58) Field of Classification Search
CPC ...... B21D 35/001; B21D 22/022; C21D 1/42; C21D 7/02; C21D 7/13; C21D 8/005; C21D 8/02; C21D 8/0205; C21D 8/0494; C21D 9/46; C21D 2211/001; C21D 2211/008; C21D 2221/00; C21D 2221/02; C21D 2221/10; C21D 2241/01; C21D 2261/00
See application file for complete search history.

(56) References Cited

U.S. PATENT DOCUMENTS

| 2003/0029216 | A1 | 2/2003 | Carlsson et al. |
| 2009/0235715 | A1* | 9/2009 | Werz ................ C21D 9/02 72/342.1 |
| 2012/0111161 | A1 | 5/2012 | Kuriki et al. |
| 2016/0144416 | A1 | 5/2016 | Wolf et al. |

(Continued)

FOREIGN PATENT DOCUMENTS

| CA | 3 012 168 A1 | 7/2017 |
| CN | 107208170 A | 9/2017 |

(Continued)

OTHER PUBLICATIONS

ASM International, "Fundamentals of Heat Treating of Steel" 2006, ASM International, Practical Heat Treating, 2nd Edition, pp. 9-10 (Year: 2006).*

(Continued)

*Primary Examiner* — Sally A Merkling
*Assistant Examiner* — Dean Mazzola
(74) *Attorney, Agent, or Firm* — Sughrue Mion, PLLC

(57) ABSTRACT

A method for processing a steel plate capable of removing residual strain at a trim edge thereof without causing overheating in areas of the steel plate other than the trim edge. A method of processing a steel plate includes punching a steel plate and disposing heating electrodes in such a way that a trim edge punched in the punching is positioned between electrode surfaces facing each other and then heating a part of the steel plate including the trim edge.

5 Claims, 11 Drawing Sheets

(56) References Cited

U.S. PATENT DOCUMENTS

| | | |
|---|---|---|
| 2017/0333971 A1 | 11/2017 | Denks et al. |
| 2019/0039109 A1 | 2/2019 | Haslmayr et al. |
| 2019/0091752 A1 | 5/2019 | Takishima |
| 2020/0238360 A1 | 7/2020 | Ihara et al. |
| 2020/0291999 A1 | 9/2020 | Mizuta et al. |
| 2021/0154723 A1 | 5/2021 | Shinke et al. |

FOREIGN PATENT DOCUMENTS

| | | | | |
|---|---|---|---|---|
| EP | 3 212 348 B1 | | 9/2018 | |
| JP | 6-226479 A | | 8/1994 | |
| JP | 07-303919 A | | 11/1995 | |
| JP | 8-311694 A | | 11/1996 | |
| JP | 2002-113525 A | | 4/2002 | |
| JP | 2003-145222 A | | 5/2003 | |
| JP | 2003-523285 A | | 8/2003 | |
| JP | 2004-106035 A | | 4/2004 | |
| JP | 2007319912 A | * | 12/2007 | ........... B21D 35/001 |
| JP | 2009-255158 A | | 11/2009 | |
| JP | 2012-206539 A | | 10/2012 | |
| JP | 2016-525453 A | | 8/2016 | |

OTHER PUBLICATIONS

Notice of Allowance dated Feb. 17, 2022 issued in U.S. Appl. No. 16/732,780.
Office Action dated Sep. 30, 2021 in U.S. Appl. No. 16/732,780.
U.S. Appl. No. 16/732,780, filed Jan. 2, 2020 (Ihara).
Corrected Notice of Allowability dated Jun. 10, 2022 by the U.S. Patent and Trademark Office in U.S. Appl. No. 16/732,780.

* cited by examiner

METHOD FOR PROCESSING STEEL PLATE

CROSS REFERENCE TO RELATED APPLICATIONS

This application is based upon and claims the benefit of priority from Japanese patent application No. 2019-011010, filed on Jan. 25, 2019 and Japanese patent application No. 2019-225206, filed on Dec. 13, 2019, the disclosure of which are incorporated herein in its entirety by reference.

BACKGROUND

The present disclosure relates to a method for processing a steel plate.

One of the issues in press-forming of a high tensile strength steel is cracking in a stretch flange. This cracking in a stretch flange occurs due to residual strain on a shear end face. As a method for reducing this residual strain, a heating method is known. As a method for heating a residual strain part, a technique for applying a current and heating a bent part of a press formed product to remove residual strain is known (see, for example, Japanese Unexamined Patent Application Publication No. H07-303919).

SUMMARY

There has been a problem that it is difficult to transfer heat to an end part of a steel plate punched in punching processing and residual strain cannot be completely removed or when an end part of a steel plate is heated to such an extent that residual strain can be removed, areas other than the end part are excessively heated, thereby causing a change in the hardness of a part of the steel plate.

The present disclosure has been made to solve such a problem. An object of the present disclosure is to provide a method for processing a steel plate capable of removing residual strain at a trim edge thereof without causing overheating in areas of the steel plate other than the trim edge.

In a specific example aspect of the present disclosure, a method of processing a steel plate includes punching a steel plate and disposing heating electrodes in such a way that a trim edge punched in the punching is positioned between electrode surfaces facing each other and then heating a part of the steel plate including the trim edge. When the heating electrodes are disposed in such a way that the trim edge is sandwiched between the electrode surfaces, the trim edge can be sufficiently heated. By heating the steel plate mainly on the trim edge, residual strain can be removed appropriately and overheating of areas other than the trim edge can be avoided.

The above processing method is effective if it further includes reducing heat generated in the heating and forming a stretch flange at the trim edge. When the stretch flange is formed on the steel plate in a state where the heat is reduced, damage to a flange die can be reduced.

The above heating may include heating the trim edge to 200° C. or higher and lower than an Ac1 point. The residual strain can be appropriately removed and softening and hardening of the steel plate can also be avoided when the heating is within this temperature range.

Further, each of the heating electrodes may be a coil electrode for generating an induced electromotive force in the steel plate to carry out the heating. The heating in this case includes heating the part of the steel plate without bringing the coil electrode into contact with a surface of the steel plate. When the steel plate is heated using an induced electromotive force in this manner, damage to the heating electrodes can be reduced, because the steel plate can be heated without bringing the heating electrodes into contact with the surface of the steel plate. In this case, when the above-described punching includes punching a hole in the steel plate, it is desirable that the coil electrode be provided to surround the hole. When induction heating is used in this way, the trim edge can be efficiently heated by the edge effect. Moreover, when an insulator part is provided on a peripheral part of the coil electrode, in the above heating, the insulator part may be brought into contact with the surface of the steel plate to heat the above part of the steel plate. When the insulator part is brought into contact with the surface of the steel plate, it is possible to stably heat the steel plate while preventing damage to the coil electrode.

According to the present disclosure, it is possible to provide a method for processing a steel plate capable of removing residual strain at a trim edge thereof without causing overheating in areas of the steel plate other than the trim edge.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be described through embodiments of the invention, but the disclosure according to the claims is not limited to the following embodiments.

Further, all of the configurations described in the embodiments are not necessarily essential as means for solving the problem.

First Embodiment

Figure 1:
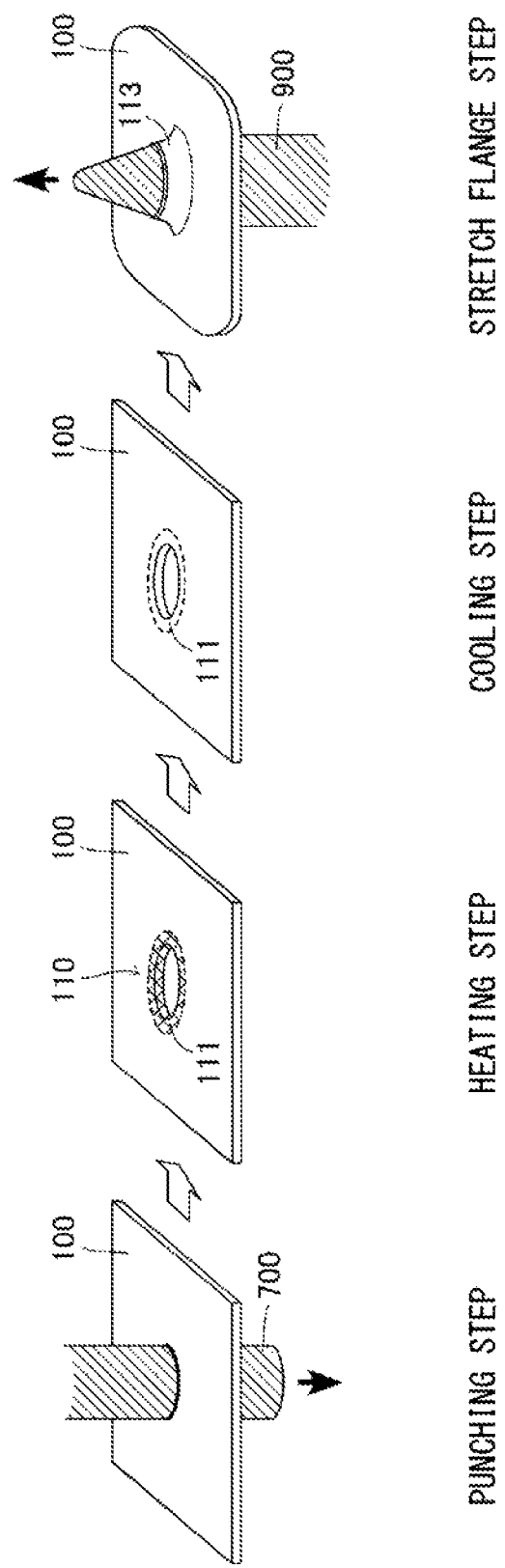
FIG. 1 is a schematic diagram schematically showing steps of a processing method according to an embodiment.

FIG. 1 is a schematic diagram schematically showing steps of a processing method according to this embodiment.

In the processing method described below, a hole is punched through a steel plate as a workpiece, and a peripheral edge of the hole is deformed to form a stretch flange. As shown in FIG. 1, broadly speaking, the processing method includes a punching step of punching a steel plate, a heating step of heating a part of the steel plate including a trim edge, a cooling step of reducing the heat generated in the heating step, and a stretch flange step of forming a stretch flange at the trim edge.

The punching step includes punching a steel plate 100 fixed to a punching die by a punch 700. As will be described in detail later, the heating step is a step of heating a peripheral edge of a hole 110 formed in the punching step. The area heated in the heating step is a heating area 111 including a trim edge of the hole 110, which area is a part of the steel plate 100.

The cooling step is a step of reducing the heat in the heating area 111 heated in the heating step. Specifically, the steel plate 100 is left for a certain time in a room temperature environment. The stretch flange step is a step of inserting a flange die 900 into the hole 110 and plastically deforming a peripheral edge part of the hole 110 to thereby form a stretch flange 113.

Residual strain generated at the peripheral edge part of the hole 110 in the punching step is removed in the heating step. After the cooling, the steel plate 100 is subjected to the stretch flange step. When the stretch flange is formed on the steel plate 100 in a cooled state, it is possible to reduce the damage to the flange die 900 more than when the stretch flange is formed on the steel plate 100 in a heated state. In particular, in this embodiment, since the steel plate 100 can be sufficiently heated up to the trim edge, the residual strain can be satisfactorily removed. This will be described later. When a hole-expansion test was conducted by punching a hole of φ10 mm in a 1.2 mm steel plate of a 1180GA material and pushing a triangular pyramid die into the hole, a rate of the diameter expansion until cracking occurs was $\lambda=35\%$ when the steel plate 100 is not heated, while a rate of the diameter expansion until cracking occurs was $\lambda=53\%$ in the processing method according to this embodiment.

Figure 2:
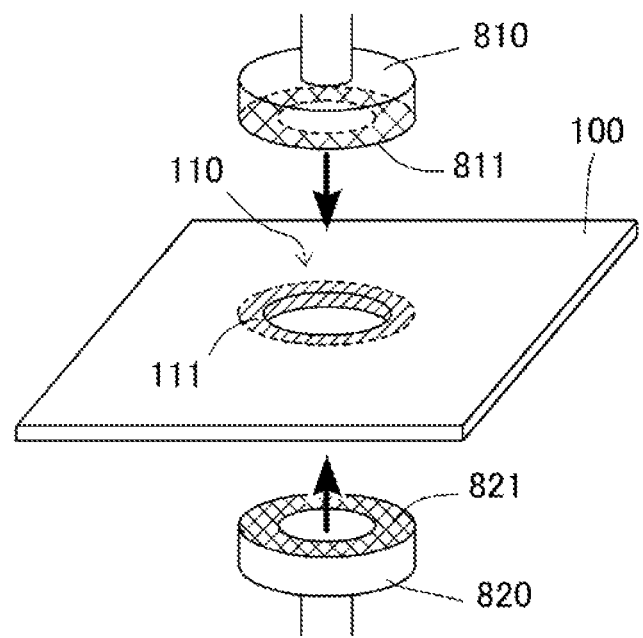
FIG. 2 is a schematic diagram for describing contact between a steel plate and heating electrodes in a heating step.

FIG. 2 is a schematic diagram for describing contact between the steel plate 100 and the heating electrodes in the heating step. The heating step is carried out by sandwiching the steel plate 100 between a first heating electrode 810 and a second heating electrode 820, which are a pair of heating electrodes, and then applying a current to heat the steel plate 100. Specifically, an electrode surface 811 of the first heating electrode 810 is brought into contact with one surface side of the heating area 111 of the steel plate 100, and an electrode surface 821 of the second heating electrode 820 is brought into contact with another surface side of the heating area 111 of the steel plate 100, and then a current is applied to the steel plate 100.

The heating temperature at this time is adjusted in such a way that a trim edge face becomes 200° C. or higher and lower than the Ac1 point. The residual strain can be appropriately removed when the heating is within this temperature range. In particular, when the steel plate 100 is heated to the Ac1 point or higher, the steel plate 100 undergoes austenite transformation. Thus, the steel plate 100 softens when air-cooled or hardens when rapidly cooled by running water or the like, and then formability in the stretch flange step decreases. Therefore, it is desirable to keep the heating temperature below the Ac1 point.

Figure 3:
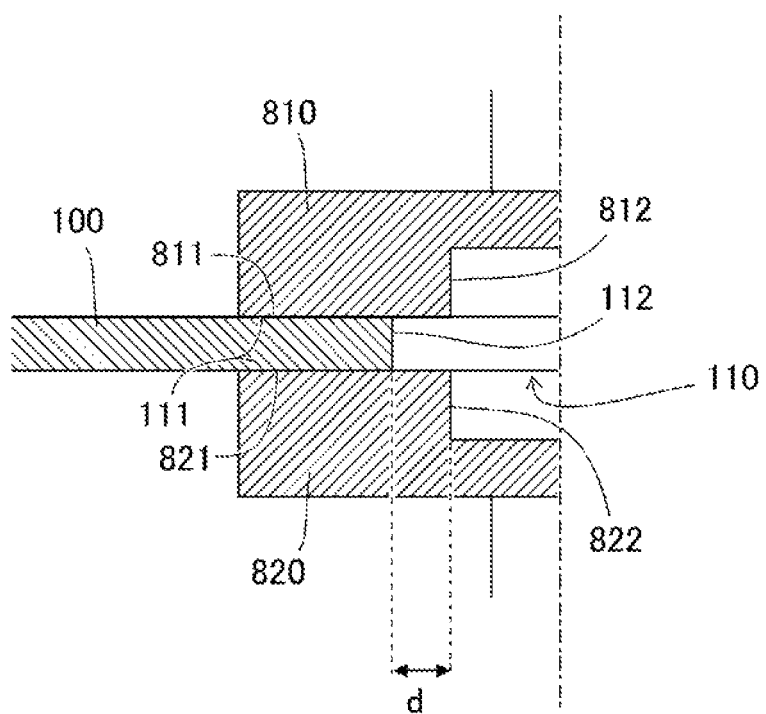
FIG. 3 is a partial cross-sectional view showing a state in which the heating electrodes are brought into contact with a steel plate in the heating step.

FIG. 3 is a partial cross-sectional view of the heating electrodes brought into contact with the steel plate 100 in the heating step. More specifically, FIG. 3 is a cross-sectional view showing one side of the heating electrodes brought into contact with the steel plate 100 with respect to a central axis in a cross section including the central axis of the hole 110.

As shown in the drawing, a trim edge 112 which is an inner peripheral surface of the hole 110 is disposed so as to be positioned between the surfaces of the electrode surfaces 811 and 821 facing each other. In other words, the inner end surface 812 of the first heating electrode 810 and the inner end surface 822 of the second heating electrode 820 project from the trim edge 112 toward the center of the hole 110 by a length d shown in the drawing. When the heating area 111 is heated with such an arrangement, the trim edge 112 can be sufficiently heated, and the residual strain concentrated on the peripheral part of the trim edge 112 can be satisfactorily removed. Further, since the heating area 111 is a part of the entire steel plate 100, electric power for heating unnecessary areas can be reduced, and overheating that causes softening and hardening can be avoided.

Note that the trim edge 112 may project from the inner end surface 812 of the first heating electrode 810 and the inner end surface 822 of the second heating electrode 820 toward the center of the hole 110.

As shown in FIGS. 2 and 3, the electrode surfaces 811 and 821 of the first heating electrode 810 and the second heating electrode 820, respectively, are annular. However, the electrode surfaces 811 and 821 may simply be circular as long as the trim edge 112 is disposed between the electrode surfaces 811 and 821.

Figure 4:
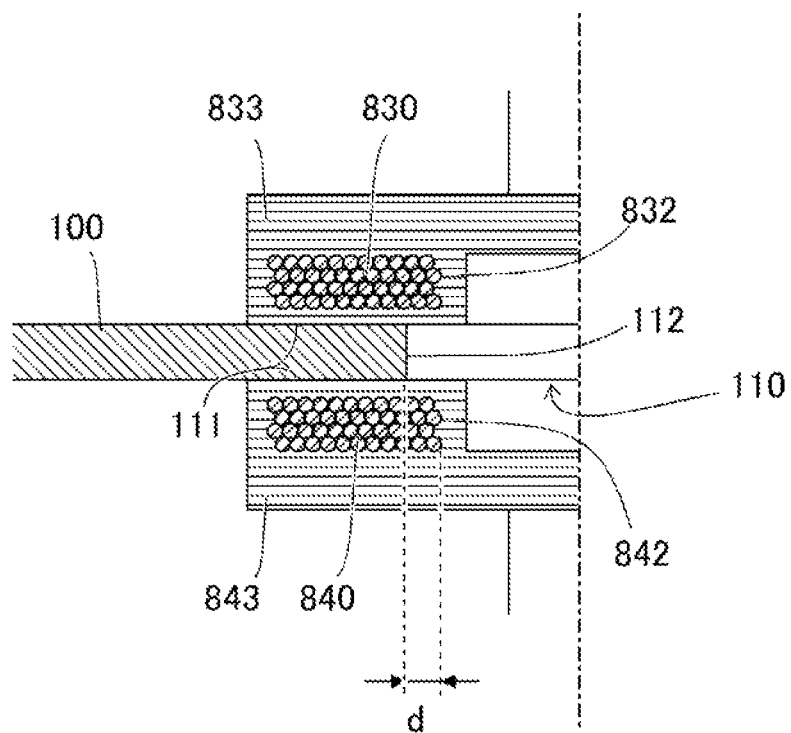
FIG. 4 is a partial cross-sectional view showing a relationship between heating electrodes and a steel plate when other heating electrodes are used.

FIG. 4 is a partial cross-sectional view showing a relationship between heating electrodes and the steel plate 100 when other heating electrodes are used. Like FIG. 3, FIG. 4 is a cross-sectional view showing one side of the heating electrodes and the steel plate 100 with respect to the central axis in the cross section including the central axis of the hole 110.

The pair of heating electrodes shown in the drawing is a coil electrode that applies an alternating current to generate an induced electromotive force in the steel plate 100 to thereby heat the steel plate 100. The pair of heating electrodes is composed of a first heating coil 830 and a second heating coil 840. The first heating coil 830 is surrounded by a first support 833 that is an insulator, and the second heating coil 840 is surrounded by a second support 843 that is an insulator. During the heating, the first support 833 and the second support 843 are brought into contact with the surfaces of the steel plate 100. As a result, the distance between the first heating coil 830 and the second heating coil 840 becomes stable, which makes it easy to control the temperature. Further, since the first heating coil 830 and the second heating coil 840 are not brought into direct contact with the surfaces of the steel plate 100, damage to the electrodes can be reduced.

As shown in the drawing, a trim edge 112 which is an inner peripheral surface of the hole 110 is disposed so as to be positioned between the electrode surfaces facing each other. In other words, an inner end surface 832 of the first heating coil 830 and an inner end surface 842 of the second heating coil 840 project from the trim edge 112 toward the center of the hole 110 by a length d shown in the drawing. When the heating area 111 is heated with such an arrangement, the trim edge 112 can be sufficiently heated, and the residual strain concentrated on the peripheral part of the trim edge 112 can be satisfactorily removed. Further, since the heating area 111 is a part of the entire steel plate 100, electric power for heating unnecessary areas can be reduced, and overheating that causes softening and hardening can be avoided.

There can be various shapes and arrangements of the first heating coil 830 and the second heating coil 840. In this modified example, the first heating coil 830 and the second heating coil 840 are provided so as to surround the hole 110 in an annular shape. By providing the heating coils in this manner, the heating area 111 including the trim edge 112 can be efficiently heated.

Figure 5:
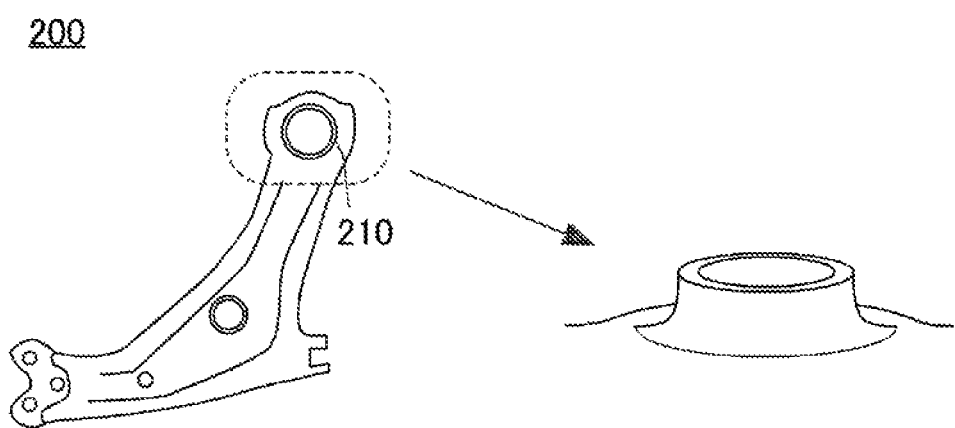
FIG. 5 illustrates an example of a formed product.
Figure 6:
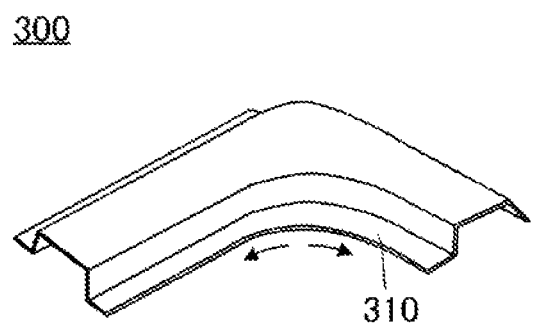
FIG. 6 illustrates an example of another formed product.

An example of a formed product formed by the above-described processing method will be described. FIG. 5 illustrates an FR lower arm 200 used for a vehicle suspension as a first example of the formed product. As shown in an enlarged view of a part surrounded by a dotted line, a bush press-fitting part 210 of the FR lower arm 200 is formed by the above-described processing method. FIG. 6 illustrates an A pillar lower 300 used for a window column of a vehicle as a second example of the formed product. In the above-described processing method, a case in which the hole 110 is provided in the steel plate 100 is described as an example. However, the punching step of punching the steel plate 100 is not limited to punching a hole and may instead include cutting off an unnecessary part. In the stretch flange step, a flange die is pressed against the trim edge, from which an unnecessary part has been cut off, to form a stretch flange. A stretch flange forming part 310 of the A pillar lower 300 is formed in this way.

Second Embodiment

Figure 7:
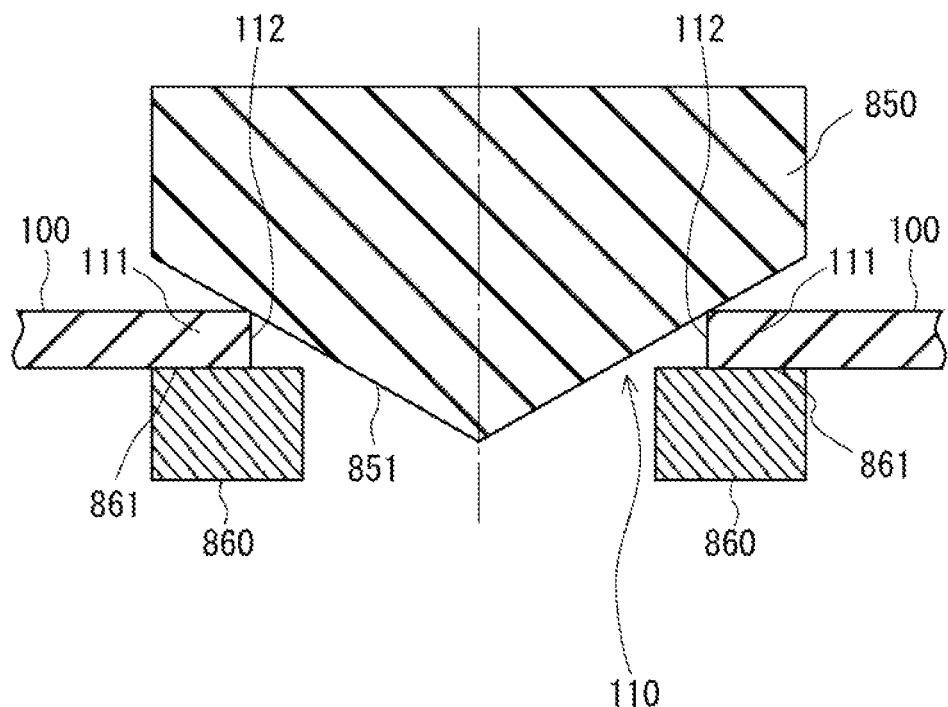
FIG. 7 is a cross-sectional view showing a configuration of first and second heating electrodes according to the embodiment.

In this embodiment, at least one of first and second heating electrodes that face each other is configured to be in line contact with the trim edge 112. FIG. 7 is a schematic cross-sectional view showing a configuration of the first and second heating electrodes according to this embodiment. A first heating electrode 850 has, for example, a conical shape, and is in line contact with a corner part of the trim edge 112 of the steel plate 100. On the other hand, a second heating electrode 860 has a cylindrical shape. The first heating electrode 850 and the second heating electrode 860 are formed of, for example, copper.

In the heating step, the trim edge 112 of the steel plate 100 is sandwiched between the first heating electrode 850 having a conical shape and the second heating electrode 860 having a cylindrical shape, and a current is applied to heat the steel plate 100. Specifically, an electrode surface 851 of the first heating electrode 850 is brought into line contact with the corner part of the trim edge 112 of the steel plate 100, and an electrode surface 861 of the second heating electrode 860 is brought into contact with another surface side of the heating area 111 of the steel plate 100, and then a current is applied to the heating electrodes.

As shown in FIG. 7, the second heating electrode 860 has a cylindrical shape, but the present disclosure is not limited to this. The second heating electrode 860 may have, for example, a columnar shape as long as the heating area 111 of the steel plate 100 can be sandwiched between the first heating electrode 850 and the second heating electrode 860. The second heating electrode 860 may have a conical shape, and the first heating electrode 850 may have a cylindrical shape.

In the punching step, burrs are generated at the trim edge 112 of the steel plate 100. A conical heating electrode may be disposed on the side of the steel plate 100 where the burrs are generated. This is because the current density of the conical heating electrode is higher, which makes it easy to crush the burrs, thereby making it easy to process the steel plate 100 in the subsequent processes.

Figure 8:
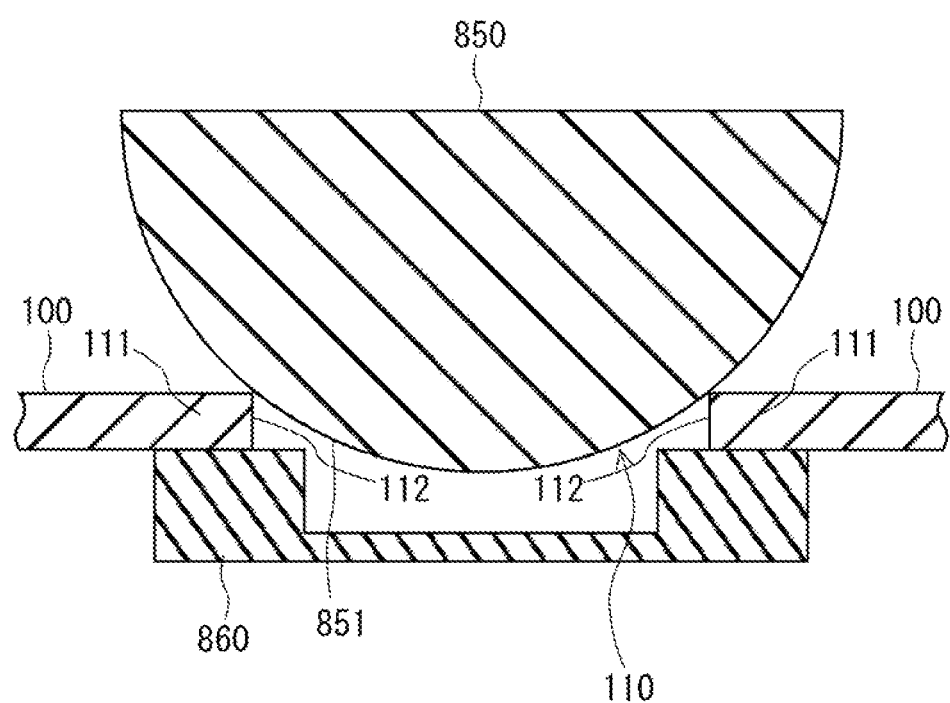
FIG. 8 is a schematic cross-sectional view showing another configuration of the first heating electrode.
Figure 9:
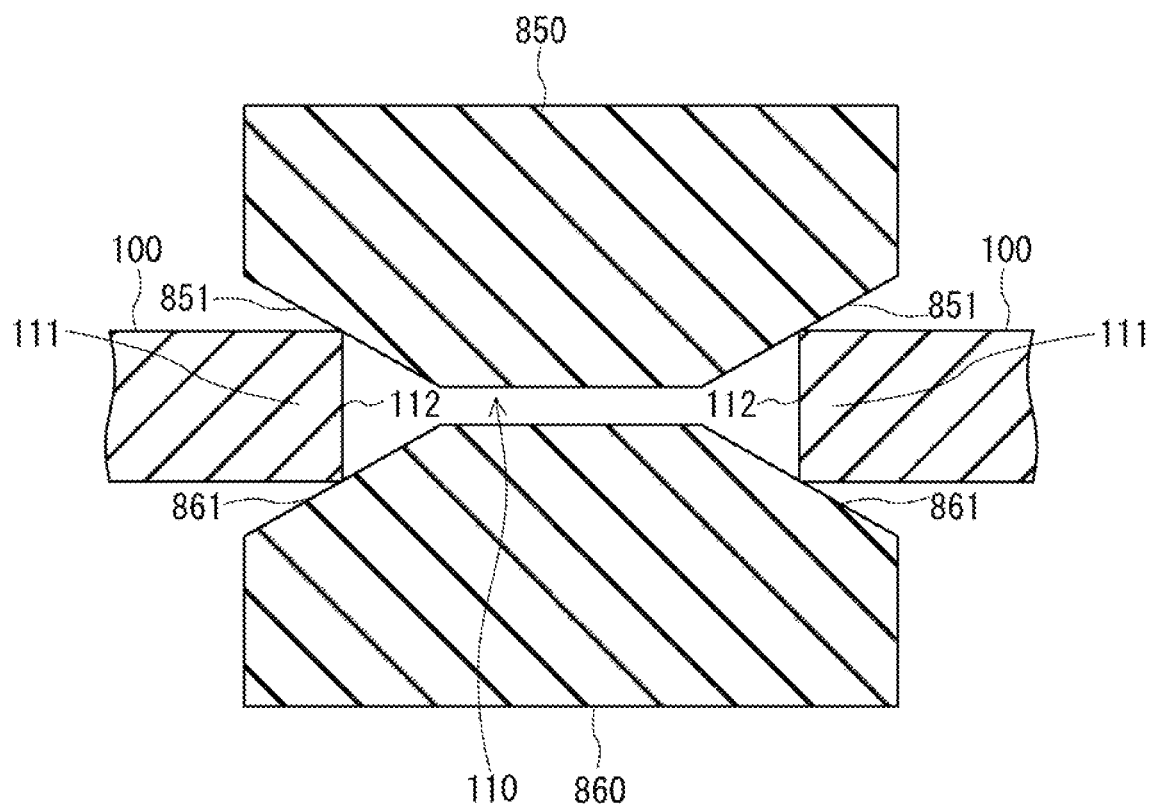
FIG. 9 is a schematic cross-sectional view showing another configuration of the first and second heating electrodes.

Further, as shown in FIG. 8, the first heating electrode 850 has a spherical shape, and may be in line contact with the corner part of the trim edge 112 of the steel plate 100. The electrode surface 851 of the first heating electrode 850 is in line contact with the corner part of the trim edge 112 of the steel plate 100. Furthermore, both the first heating electrode 850 and the second heating electrode 860 facing each other may be configured to be in line contact with the corner parts of the trim edge 112, respectively. For example, as shown in FIG. 9, each of the first heating electrode 850 and the second heating electrode 860 has a truncated conical shape. The electrode surface 851 of the first heating electrode 850 is in line contact with the corner part of the trim edge 112 of the steel plate 100. Likewise, the electrode surface 861 of the second heating electrode 860 is in line contact with the corner part of the trim edge 112 of the steel plate 100. Then, the current density of the first heating electrode 850 and the second heating electrode 860 can be made higher, and the trim edge 112 can be heated uniformly.

Note that, as described above, the punching step of punching the steel plate 100 is not limited to punching a hole. For example, as shown in FIG. 6, when an unnecessary part is cut off in the punching step of punching the steel plate 100 to form the A pillar lower 300 or the like, at least one of the first heating electrode 850 and the second heating electrodes 860 may be configured to be in line contact with the cut off part.

In this embodiment, at least one of the first heating electrodes 850 and the second heating electrode 860 is brought into line contact with the corner part of the trim edge 112 to increase the current density. Then, the trim edge 112 of the steel plate 100 can be heated more uniformly and efficiently, and the residual strain can be satisfactorily removed.

Next, an effect exerted by the first and second heating electrodes according to this embodiment will be described in detail. In this embodiment, the following hole-expansion test (1) to (4) is conducted.

(1) A φ10 mm hole 110 is formed in the steel plate 100. A punching clearance is 12%.

(2) After the hole 110 is formed, the hole 110 of the steel plate 100 is sandwiched between the first heating electrode 850 having a conical shape and the second heating electrode 860 having a cylindrical shape (FIG. 7), and a current is applied to the first heating electrode 850 and the second heating electrode 820. At this time, the heating area 111 of the hole 110 is sandwiched between the first heating electrode 850 and the second heating electrode 860 at a pressure of 250 kgf, and power with an AC voltage of 200 V and a current of 2 to 8 kA is supplied to the first heating electrode 850 and the second heating electrode 860 for one second.

The steel plate 100 is 100 mm×100 mm 1180 GA (galvanized steel plate having a tensile strength of 1180 MPa) and has a thickness of 1.2 mm. An apex angle of the conical shape of the first heating electrode 850 is 120°, and a diameter of a bottom surface of the first heating electrode 850 is 15 mm. An inner diameter of the cylindrical shape of the second heating electrode 860 is 8 mm, and an outer diameter thereof is 15 mm.

(3) After a current is applied and the steel plate 100 is heated, the heated steel plate 100 is cooled to room temperature.

Figure 10:
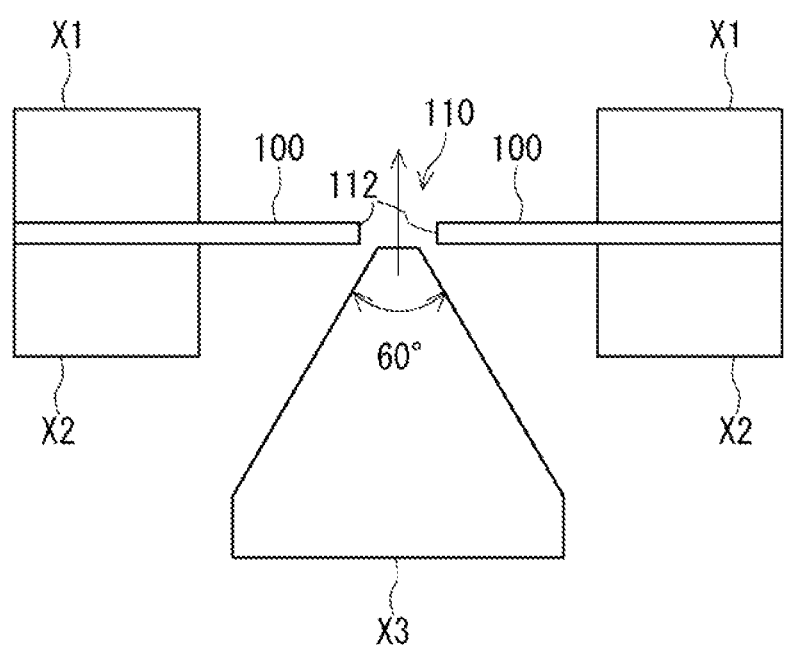
FIG. 10 a drawing for describing a hole-expansion test.

(4) After the steel plate 100 is cooled, a hole-expansion test is conducted. Specifically, as shown in FIG. 10, the steel plate 100 is sandwiched and fixed by dies X1 and holders X2, and a triangular pyramid die X3 having an apex angle of 60° is pushed into the hole 110. Note that the side of the trim edge 112 of the steel plate 100 where the burrs are generated is positioned on the opposite side (outer side) of the die X3.

Figure 11:
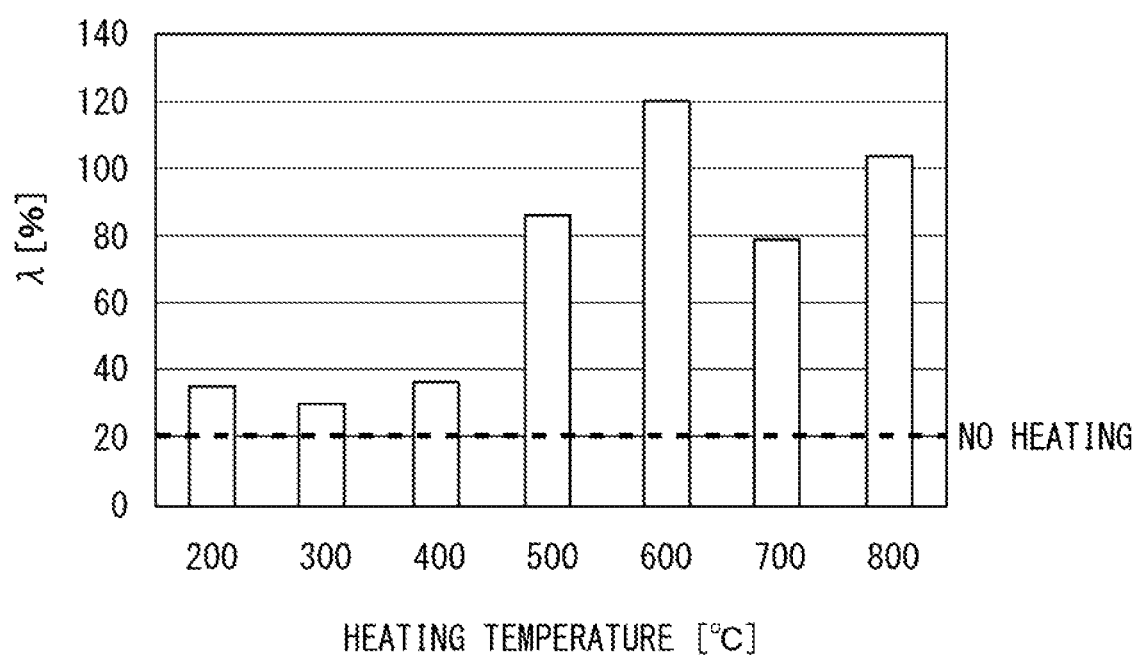
FIG. 11 shows a result of a test on a 1180GA steel plate having a thickness of 1.2 mm.
Figure 12:
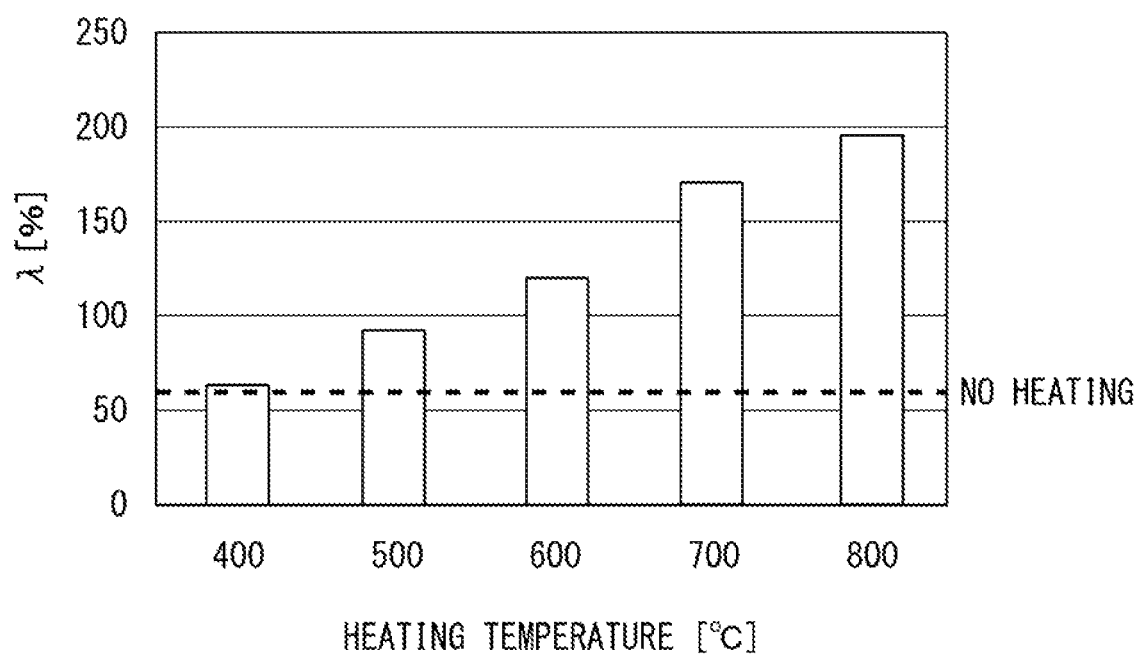
FIG. 12 shows a result of a test on a 980HR steel plate having a thickness of 2.9 mm.

FIG. 11 is a drawing showing a result of the test on the above-described 1180 GA steel plate 100 having a thickness of 1.2 mm. FIG. 12 is a drawing showing a result of the test on the 980HR steel plate 100 (hot-rolled material having a tensile strength of 980 MPa) with a thickness of 2.9 mm, under the same conditions as those described above. In FIGS. 11 and 12, the horizontal axis represents a heating temperature of the trim edge 112 of the steel plate 100, and the vertical axis represents a rate of the diameter expansion of the hole until a crack penetrates the trim edge 112 of the steel plate 100. The expansion rate λ is calculated using, for example, the following formula.

$$\lambda = (d_b - d_0)/d_0 \times 100$$

In this formula, $d_b$ is a hole diameter when a crack penetrates, and $d_0$ is an initial hole diameter before the triangular pyramid die X3 is pushed into the hole. Five hole expansion tests are conducted, and an average value of λ, in the five tests is calculated.

Regarding the above 1180GA, as shown in FIG. 11, the expansion rate is λ=20% when the steel plate is not heated, whereas in the processing method according to this embodiment, λ reaches the maximum when the heating temperature is 600° C., which is an improvement of approximately 120%. Further, regarding the above 980HR, as shown in FIG. 12, the expansion rate is λ=60% when the steel plate is not heated, whereas in the processing method according to this embodiment, reaches the maximum when the heating temperature is 800° C., which is an improvement of approximately 200%.

In the second embodiment, the same parts as those in the first embodiment are denoted by the same reference signs, and detailed description thereof is omitted.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method of processing a steel plate comprising:
   punching a steel plate; and
   disposing heating electrodes in such a way that front and rear surfaces of the steel plate are sandwiched between electrode surfaces facing each other and a trim edge punched in the punching is positioned between the electrode surfaces, and then heating a part of the steel plate including the trim edge by applying a current to the heating electrodes,
   wherein the disposing includes:
   disposing an electrode surface of a first heating electrode so as to be in line contact with a corner part of the trim edge from the front surface side of the steel plate and an electrode surface of a second heating electrode so as to be in contact with the rear surface of the steel plate such that the second heating electrode does not protrude past the rear surface of the steel plate, and
   wherein the first heating electrode and the second heating electrode differ in shape.

2. The method according to claim 1, further comprising:
   reducing heat generated in the heating; and
   forming a stretch flange at the trim edge.

3. The method according to claim 1, wherein in the heating, the trim edge is heated to 200° C. or higher and lower than an Ac1 point.

4. The method according to claim 1, wherein the first heating electrode has a conical shape or a spherical shape.

5. The method according to claim 1, wherein the first heating electrode is disposed on a side of the trim edge of the steel plate where burrs are generated in the punching.

* * * * *